H. L. DOHERTY.
METHOD OF CARBONIZING FUEL IN VERTICAL RETORT GAS BENCHES FOR THE PRODUCTION OF GAS AND CARBONIZED FUEL.
APPLICATION FILED NOV. 15, 1911. RENEWED APR. 28, 1916.
1,187,049.
Patented June 13, 1916.
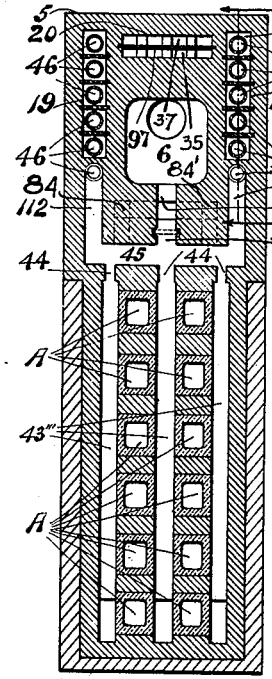
FIG. 11
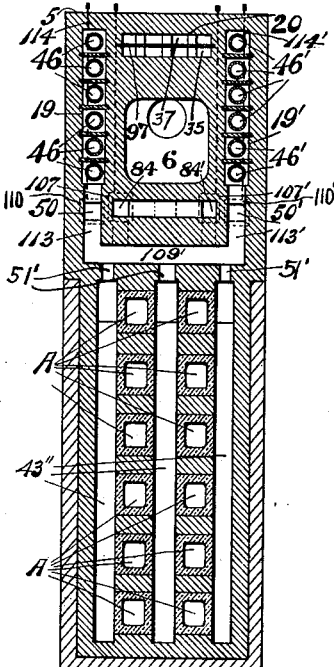
FIG. 6
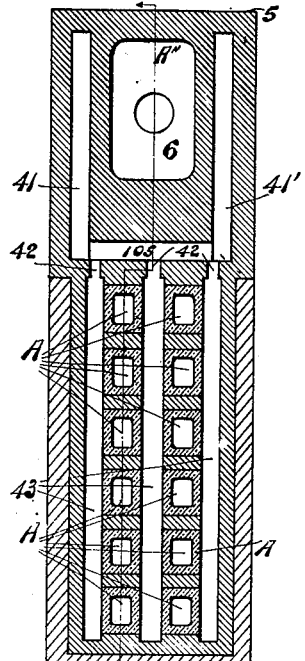
FIG. 4
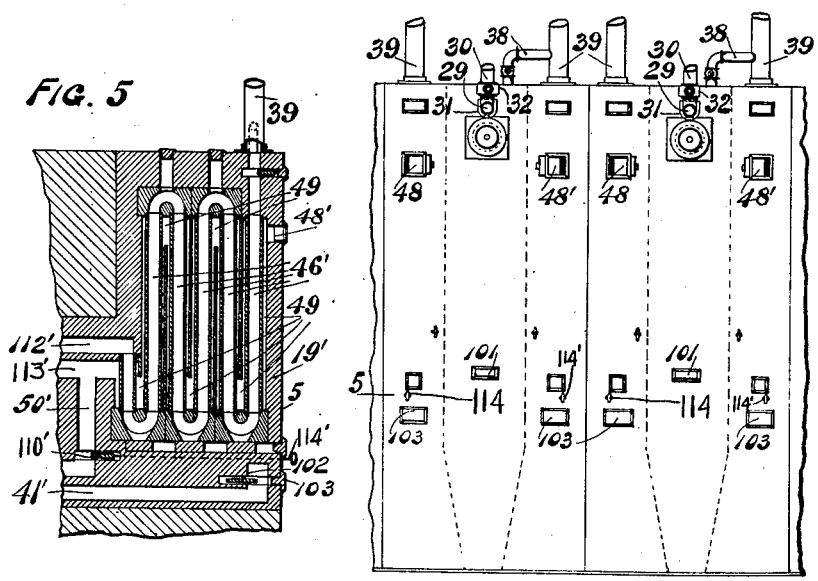

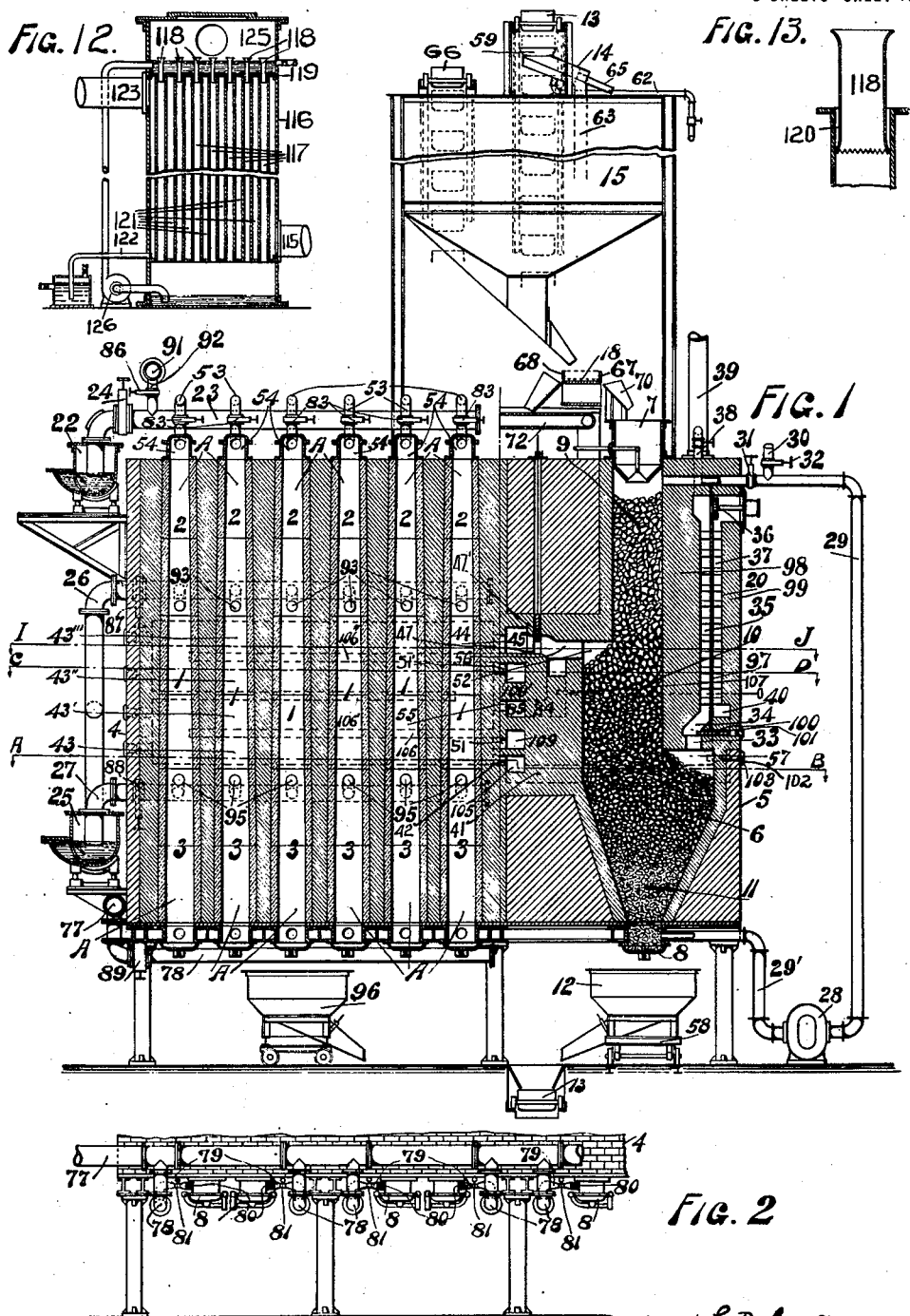

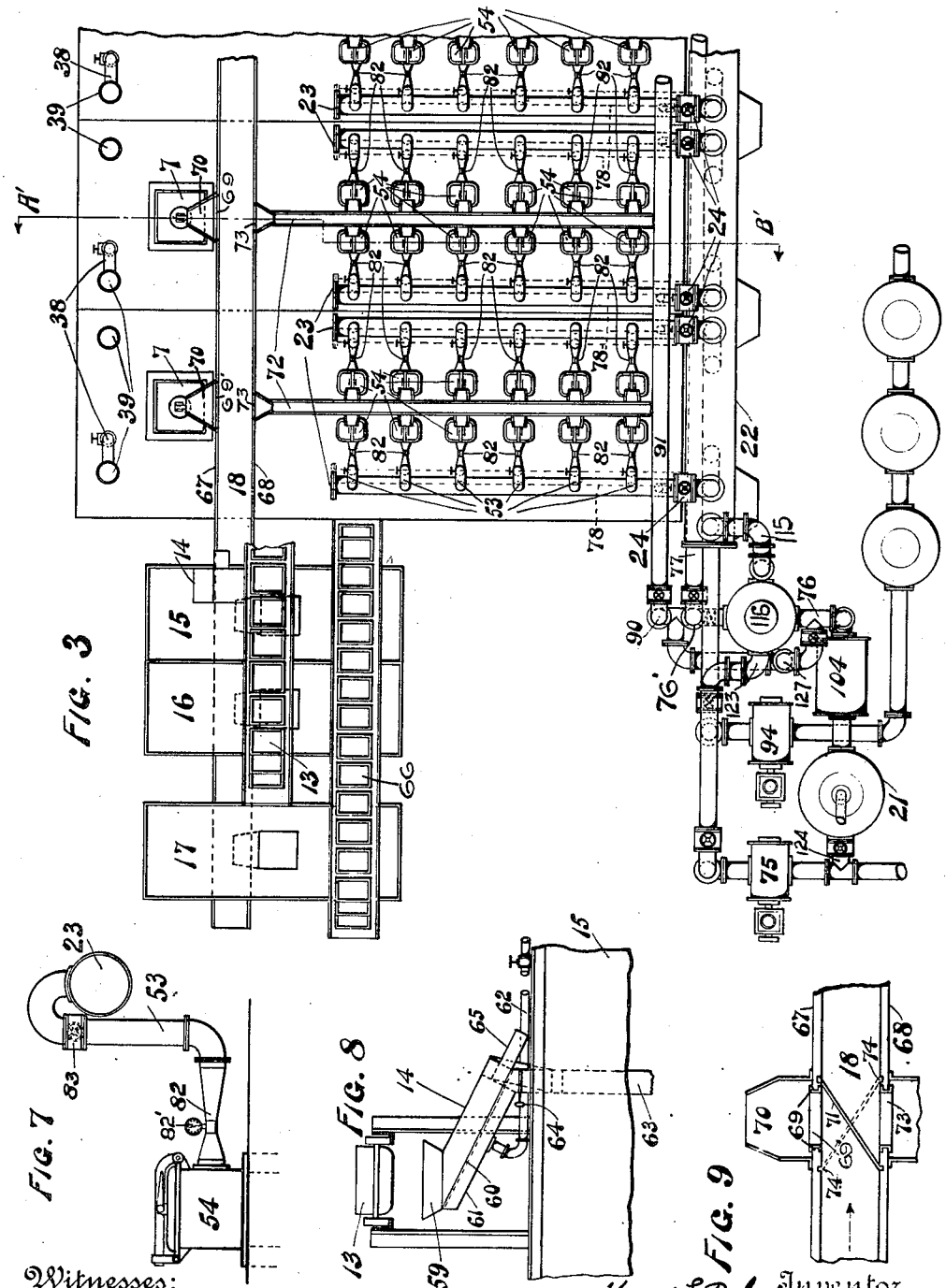

UNITED STATES PATENT OFFICE.

HENRY L. DOHERTY, OF NEW YORK, N. Y.

METHOD OF CARBONIZING FUEL IN VERTICAL-RETORT GAS-BENCHES FOR THE PRODUCTION OF GAS AND CARBONIZED FUEL.

1,187,049.  Specification of Letters Patent.  Patented June 13, 1916.

Application filed November 15, 1911, Serial No. 660,450. Renewed April 28, 1916. Serial No. 94,275.

*To all whom it may concern:*

Be it known that I, HENRY L. DOHERTY, a citizen of the United States, and resident of New York city, in the county of New York and State of New York, have invented certain new and useful Improvements in Methods of Carbonizing Fuel in Vertical-Retort Gas-Benches for the Production of Gas and Carbonized Fuel, of which the following is a specification.

This invention relates to a method of carbonizing fuel in vertical retort benches for the production of gas and carbonized fuel.

The object of my invention is to improve the manufacture of illuminating gas from fuels containing hydrogenous matter, in retorts or the like, by reducing the proportion of fuel required for heating the retorts, by taking the gas off of the retorts in a comparatively cool and pure condition, whereby the size of the apparatus required for the cooling and purification of the gas is diminished and the purification facilitated, by quenching and cooling the coke in the retort itself and at the same time returning and utilizing its sensible heat in the carbonization, by making it possible without change of apparatus to either recover the volatile tarry products of the coal separately from the main body of distillation gas or else to wholly convert the same into permanent gases and fixed residuum, as well as by the introduction of various minor features of treatment which will be revealed in detail below.

Briefly stated, my invention comprises the carbonization of fuel in elongated vertical chambers or retorts which are heated at a middle zone only, the portion of each retort above the said middle zone serving as a fuel preheating and tar condensing chamber, while the portion below the middle zone serves as a cooling chamber for the carbonized fuel. The retorts are, during operation, always maintained fully charged—fresh fuel being charged in at the top as carbonized fuel is withdrawn from the bottom. The gases produced by the distillation of the fuel in the middle zone are drawn off from the upper part of the retorts, and therefore through the mass of relatively cool fuel in the preheating chambers. The relative weights of fuel and gas will usually be such that the gas will be cooled down to at least 300° F., at which temperature substantially all of the heavy tarry matters of the gas will condense, the gas discharging comparatively cool and free from tar, but carrying water vapor and such light hydrocarbons as benzol, etc. The carbonized material is drawn down from the carbonizing zone proper into the cooling zone and there cooled by a current of gas or steam, or a combination of the two. For the cooling current it is advantageous to use a portion of the distillation gas itself after the removal of its illuminants and ammonia, together with more or less water vapor. The water vapor may advantageously be generated by the sensible heat of the gas as it is drawn off from the retorts and the latent heat of the water vapor which it carries. By evaporating the water directly into the deluminated gas returning to the retorts the evaporation may be carried out at a temperature below 212°, owing to the reduction of the partial pressure exerted by the steam formed by the presence of the gas. The mixture of deluminated gas and water vapor passes up through the carbonized fuel in the cooling sections of the retorts, taking up the heat of the fuel and quenching the same, and at the same time facilitating the evolution from the carbonized fuel of the residual volatile matter which it contains. The returned gases then pass on up through the retort and join the main stream of gas which is being evolved from the fuel in the carbonizing zone proper. A portion of the volatile matter of the fuel is driven off from the same in the lower part of the preheating zone, by the comparatively hot gases from the carbonizing zone. When the tarry matters have accumulated in the preheating chambers to a degree which becomes objectionable, the flow of gas through the retorts is reversed—the cool returned gas being introduced at the top of the retorts and passed down through the tar-laden fuel in the preheating chambers, blowing the tarry liquid out of the interstices of the fuel therein and carrying it down in contact with the hot coke in the lower part of the preheating region of the retort whereby the tar is re-vaporized. The returned gas laden with the tar vapors may be then either drawn off at a selected point above the carbonizing zone proper or else drawn down through the hot carbonized fuel in the said zone. In the former case the tar vapors may be again condensed, while in the latter case the tar is converted by the hot coke into permanent gases, difficultly-condensable hydrocarbons which may be utilized in the enriching of the distillation gas and fixed residuum which deposits in the coke, increasing its density and hardness.

My invention also comprises various other features which are set forth below.

It will be seen that my process in part may be summarized in general terms as a process of heating and treating materials which comprises advancing material to, through and beyond a zone of high temperature, wherein changes in such material are accomplished, cooling the hot material beyond the said zone by a current of cooling gas, and bringing the gas thus heated into heat-transferring relationship to cool material advancing toward said zone.

In the drawings I have shown an apparatus embodying my invention and adapted to use in the carrying out of my process.

Figure 1 is a vertical cross-section through one of the beds of the bench with its coöperating gas producer on the line 1—1 of Fig. 3 and line 1—1 of Fig. 4. Fig. 2 is a rear elevation of a portion of the bench showing the lower mouthpieces and the arrangement of the gas connections to the same. Fig. 3 is a partial plan of the apparatus. Fig. 4 is a horizontal cross-section through one of the beds and its coöperating furnace at the level 4—4 of Fig. 1. Fig. 5 is a vertical cross-section through a recuperator on the line 5—5 of Fig. 11. Fig. 6 is a horizontal cross-section of the same bed on the line 6—6 of Fig. 1. Fig. 7 is a detail view on an enlarged scale showing a side elevation of one of the gas off-take connections. Fig. 8 is an elevation of the screening device and fuel bin. Fig. 9 is a detail on an enlarged scale showing a portion of a fuel conveyer and the method of discharging the fuel from the same. Fig. 10 is a partial front elevation of the battery of producers. Fig. 11 is a horizontal section through the setting on the line 11—11 of Fig. 1. Fig. 12 is a vertical cross-section through the water evaporator. Fig. 13 is a detail showing a vertical section through one of the water distributers of the evaporator.

In the several figures, A, A, etc., are the retorts, 1, 1, etc., the carbonizing chambers of the retorts, 2, 2, 2, etc., are the preheating chambers of the same, 3, 3, 3, etc., the fuel cooling chambers of the same.

4 and 5 are, respectively, the rear and front walls of the bench shown in Fig. 1.

6, 6, 6, etc., are the gas-producing furnaces of the bench. 7, 7, etc., the fuel hoppers of the furnaces 6. 8, 8, etc., the discharging doors of the furnaces 6. The furnaces 6 have three distinct sections which may be designated as the preheating chambers, 9, the gas generating chambers, 10, and the cooling chambers, 11.

12 is a movable coke hopper and chute into which the mixture of fuel and ash drawn from the furnaces is received and from which it is gradually fed into the conveyer 13, which elevates the mixture to the screening device 14, from which the screened fuel passes to the bin 15.

16 is a bin for storing the raw coal used in the producer.

17 is a bin for the coal used in the retorts.

18 is a coal conveyer which is so constructed that it transports in turn both the fuel charge for the furnaces and that for the retorts.

72, 72, etc., are small lateral conveyers which receive the retort fuel from the conveyer 18 and transports it to the mouths of the retorts.

19 is one of the air recuperators of a bed, while 20 is the heat interchanger of the same.

21 is a deluminator or scrubber in which the portion of the gas returned to the retorts is scrubbed with what is technically known as wash oil to absorb the illuminants from the gas.

104 is an ammonia scrubber through which the gas passes after leaving the deluminator 21.

22 is the hydraulic main which receives the normal gas from the dry mains 23. There is, as shown, one dry main for each row of retorts.

24, 24, etc., are the valves on the dry mains.

25 is an auxiliary hydraulic main which receives the gas drawn off of the retorts during reversal through the dry mains 26 or 27 according to whether the tarry matters are drawn off in the volatilized or permanently gasified condition.

116 is the water evaporator.

The method of operating my apparatus is as follows: In starting operations fuel beds are built up in the furnaces by any preferred method. By one method coarse screened cinder is first charged into the furnace chambers until the coolers 11 have been filled. Fires are then kindled in the furnaces, air being supplied by the blowers 28. To permit this, the pipes 29 connecting the inlets of the respective blowers with the upper part of the preheaters of the respective furnaces are each provided with a branch, 30, in communication with the atmosphere. By means of valves 31 and 32 the blower is put in communication with the atmosphere while the connection to the top of the preheating chamber is cut off. Air in excess is thus forced up through the cinder in the coolers and supports the combustion of the ignited fuel thereabove. The products of combustion pass off from the furnace through the regular gas off-take flues 33 to the equalizing flue 34 of the heat interchanger 20, thence to the upcast flue 35. Passing up through 35 the gases go through the fan 36 and are thence impelled down through the down-cast flue 37, which is separated from 35 only by the comparatively thin sheet metal diaphragm 97. This, as shown, is built into the front wall of the producer. The flues 35 and 37 are formed by off-setting a sufficient number of bricks in corresponding vertical rows in the inner portion, 98, of the front wall of the producer. The metal sheet 97 is then set in place resting against the projecting bricks of 98, and extending a sufficient distance all around beyond the flue space 35 to prevent a flow of gas around its edges into flue 37. The outer portion, 99, of the front wall is then built at the same distance from the sheet 97 as is the face of 98. Bricks, corresponding in position to the projecting bricks of 98, are off-set from 99 against the sheet 97. Around the outer margin of 97, the wall 99 is built directly against the sheet 97 as is the wall 98. In the upper part of 97 an aperture is cut just the size of the gas inlet to 36 and corresponding to it in position when 36 is in place. There are thus formed two vertical flues, 35 and 37, which are in communication with each other only through the fan 36. Since the initial temperature of the gas entering 37 in normal operation will usually not be over 1500° F. and the character of the furnace gas will be reducing rather than oxidizing it is evident that either wrought iron, soft steel or cast iron may be used for constructing 97. While it is true that during direct combustion the gases are oxidizing in character to sheet iron, their influence is not exerted for a sufficient length of time to be materially injurious to 97. Should the sheet 97 for any reason burn out, a new one may be put in position by banking the furnace, temporarily permitting the gases generated therein to escape to the atmosphere through 30, shutting off communication between the furnace and 35 by closing the flues 33 by the tile dampers 100, operated through the openings 101, tearing down the portion of the wall 98 constituting the outer wall of flue 37, inserting a new diaphragm and rebuilding the wall. During the period of banking the flues 41 and 41' should be closed by tiles 102 (accessible through openings 103) to prevent the indraft of cold air to the retort setting.

It is obvious that at the start of operations the gases will be subjected to a gradual cooling as they pass through the flues since the setting is cold and contains more or less moisture. The gases therefore reach the fan at a lower temperature than that at which they enter the lower end of flue 35. Discharging from the periphery of the fan, however, they are impelled down through the outer flue 37 and thus subjected to a reheating by the hotter gases passing in the reverse direction through the flue 35. It is plain that a heat differential having once been established between the two streams of gas, will thereafter be maintained indefinitely as long as no extraneous heating or cooling action is introduced. The amount of this heat differential will, in the absence of any extraneous influence, depend entirely upon the superficial area and heat conducting power of the walls of the flues and upon the velocity of the draft. In any given case, however, within certain limits, should the size of the flues 35 and 37 be too small the normal differential may be increased by admitting an appropriate cold gas into the inner flue 35, through the pipe 38 which is, in the construction shown, connected with the stack 39 of the recuperator 19, thus permitting the introduction of relatively cool combustion gases into the gas approaching the fan. The addition of the cold gas, of course lowers the temperature of the gas mixture reaching the fan and thus establishes the required heat differential between the two currents. In this case, the differential is further increased as the gas flows back through 37 by the increased heat capacity of the return current due to the volume of gas added. There is obviously no actual loss of heat from the gas (save the small loss to the setting) but simply a transfer of heat from the current approaching the fan to the current discharging from the fan. By this device, therefore, I am able to move hot gases with ordinary fan blowers without any sacrifice of the heat of the gas. This invention, however, I do not specifically claim herein, it forming part of the matter of another application.

From the flue 37 the combustion gases pass through the collecting flue 40 to the side flues 41 and 41'. From 41 and 41' the gases flow into the transverse flue 105 and thence distribute themselves to the three combustion flues 43, 43, 43 through the ports 42. Flowing back through the flues 43 in contact with the walls of the retorts and setting the gases pass around the end of the horizontal baffles 106 in the flues 43 and thence forward through the flues 43' to the front of the retort oven. Passing up over the ends of the horizontal baffles 106' the gases pass back again through the flues 43" to the rear of the retort chamber, thence around the ends of the uppermost baffles 106", through the flues 43''' to the front of the retort-oven, where they leave the oven through the gas off-takes 44, which communicate with the cross-flue 45. From 45 the combustion gases pass through the flues 112 and 112' to, respectively, the combustion gas flues 46 and 46' of the respective recuperators 19 and 19', through these, finally discharging through the stacks 39 to the atmosphere.

When the settings have been sufficiently dried out and heated, the apparatus is in shape to bring up to normal operating conditions. The fires in the furnaces are gradually increased in depth, the character of the gas changing gradually to a combustible gas containing carbon monoxid. When this stage has been reached, the air dampers 48 of the recuperators 19 are gradually opened, permitting air to flow through the air flues 49 of the recuperators, thence through the connections 113 and 113' and the flues 50 and 50' to either one or both of the cross-flues 109 and 109' and the respective sets of nostrils 51 and 51' into either one or both of the sets of combustion flues 43 and 43''. By means of the dampers 110 and 110' on, respectively, the connections 50 and 50', which connections establish communication between the flues 50 and 50' and the cross-flue 109, the distribution of the air between the flues 109 and 109' may be regulated at will. Operating rods 114 and 114', connected with 110 and 110' respectively, permit of the manipulation of the dampers. Since the walls of these flues 43 have been previously raised to the temperature of ignition of the combustible constituents of the furnace gas by the direct firing, the combustible constituents of the gas issuing from the ports 42 are burned by the air entering from 51. When the fuel bed has been built up above the primary current inlet 52, the remaining fuel required to fill the preheating chamber may be rapidly charged. The blowers 28 are now connected with the upper part of chamber 9 by shutting valves 32 and opening valves 31. A portion of the gases generated in the furnace 6 are now drawn by the blower 28 of each bed up through the fuel occupying the preheating chamber 9 of the furnace 6, whereby the said portion of the gases is cooled and the said fuel preheated. The portion of the fuel in the lower part of 9, when the charge contains bituminous coal, is carbonized, the distilled gases passing up with the stream of gases diverted from 10.

In passing through the fuel in the lower part of 9 any $CO_2$ or $H_2O$ that may be in the diverted current is subjected in greater or less degree to reaction with the carbon of the incandescent fuel, thereby forming combustible gas.

The cooled gas mixture is drawn off from 9 through the pipe 29 and thence forced through the pipe 29' into the lower part of cooler 11. Passing up through the fuel mass in 11, which has been subjected to partial combustion in the gas making zone 10, and therefore contains more or less ash, the gases introduced into 11 take up the sensible heat of the fuel mass, at the same time cooling the latter. By properly proportioning the volume of the gas introduced into 11 to the rate at which the solid material is withdrawn from 11 through the discharging door 8 the fuel and ash mixture may be thoroughly cooled before it has reached the discharging door 8. The heated gas passes upward through the fuel in the gas generating chamber 10 and joins the main draft current of the furnace.

At the same time that the pipe 29 is connected with the preheater 9, the speed of the fan 36 is increased and the various dampers set to provide the furnace with its normal primary draft. This, under normal working conditions, is composed of either partially burned gases drawn off from the flues 43', gases of complete combustion drawn off from the flues 43''' or of any mixture of the two required to regulate the working of the furnace.

In normal working, the furnace gas is not burned completely in the lower combustion flues 43, but the air admitted to the flues 43 from the nostrils 51 is restricted to that required to develop the quantity of heat which is demanded to maintain the proper temperature in the sections of the retorts in flues 43 and 43'. The balance of the secondary air that is required to secure complete combustion of the furnace gas is admitted by opening the air dampers 110 and 110' by means of the operating rods 114 and 114', respectively. A portion of the heated secondary air now flows through the short connections 113 and 113' to the upper cross-flue 109', thence through the air nostrils 51' into the partially burned gas which is flowing through the flues 43'' to the rear of the bench. Enough air is always introduced through the nostrils 51' to insure the complete combustion of any unburned constituents remaining in the gases by the time they have reached the flues 43''. Since the inductive effect exerted upon the draft current in the combustion flues of the retort oven, by the stacks 39 and the fans 36, is greater in the flues 43'' than in the lowest combustion flues 43 the air will tend to flow from 50 and 50' through the connecting flues and the nostrils 51' in preference to the nostrils 51. It is therefore only necessary to regulate the draft through the connections 113 and 113' by means of dampers 110 and 110' and the main air dampers 48 and 48' to secure complete control of the distribution of the air between 51 and 51'. By means of the dampers 110, 110' this distribution of the air is so regulated as to secure as uniform a temperature as possible throughout the combustion flues, 43, 43', 43'' and 43'''.

The primary draft for the furnace is, in part, drawn off from the flues 43', by diverting a portion of the partially burned gas flowing through 43' through the nostrils 55 into the cross-flue 85 and thence through the flues 84 and 84' to the primary inlet flue 56 which discharges into the space 52 above the surface of the fuel in the furnace. Dampers 107 and 107' on 84 and 84', respectively, serve to regulate the volume of the partially burned gas withdrawn from the flues 43'. The balance of the primary draft current is made up of completely burned gases withdrawn from the main combustion gas flue 45 through the flue 47 in volume regulated by the damper 47'. The two portions of the primary current mingle in the inlet flue 56 and are drawn from 56 under the inductive action of the fan 36 into the space 52 in the chamber 10 above the surface of the fuel, thence the larger portion passes down and across the column of fuel in 10, emerging into the space 57 above the free surface of the fuel and pass through the gas off-takes 33 to the heat interchanger 20, as already explained.

Both the portion of the primary current drawn off from 43' and the portion drawn off from the flue 45' are at a comparatively high temperature—from 2200° to 2500° F. While the initial temperature of the primary current is somewhat reduced by the time it reaches the furnace, still it should enter the fuel bed in the latter at a temperature above 2000° F., and usually at about 2200° F. In passing through the fuel bed in 10, more or less of the carbon dioxid of the primary draft and the water vapor carried by it react with the carbon of the fuel to form carbon monoxid and hydrogen according to the reactions

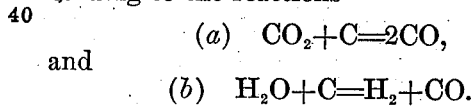

Both of these reactions absorb a large amount of heat, which is supplied by the sensible heat carried by the primary current at its entrance into the fuel bed, and sometimes by a portion of the sensible heat of the fuel itself. Since, by my method of combustion, the water vapor present in the gases is almost exclusively that derived from the air and fuel, its action in the furnace is unimportant. We only need, therefore, to consider the action of the carbon dioxid. This reacts energetically with the carbon of the fuel at temperatures approximating 1800° F. and above, but less rapidly as the temperature falls. There is more or less reaction takes place even down to 1300°. It is evident, therefore, that by regulating the quantity of $CO_2$ carried into the furnace and the quantity of heat accompanying the $CO_2$ by regulating the draw of gases from 43' and 45, respectively, I am able to maintain the fuel bed in the chamber 10 of furnace 6 at any temperature desired within the working range.

In order to secure complete combustion of the gases in the combustion flues, it is necessary to introduce a slight excess of air into the flues from the nostrils 51'. The portion of the primary draft drawn off from 45, therefore, will usually contain a small proportion of free oxygen. This, of course, burns a corresponding quantity of fuel in 10 to form CO, with the generation of heat which helps to support the reduction of the accompanying $CO_2$. Under normal working conditions, however, this excess of air is kept as low as possible. This portion of the draft current, therefore, has a strong net endothermic or heat-absorbing effect. The portion of the primary draft withdrawn from 43', on the other hand, carries under normal conditions more than enough sensible heat to dissociate its own $CO_2$ by reaction "a" and has thus a net exothermic or heating effect on the fuel bed. By varying the actual volume of the primary current and properly proportioning the two separate streams of gas making up the same I am able to control the temperature of the fuel bed in 10 and also the quantity of combustible gas generated. The volume of the gases drawn through the fuel bed is, of course, controlled by the speed of the fan 36 and the various dampers on the several conduits. This also serves to control the proportion of the $CO_2$ of the primary draft which is dissociated, since by varying the volume of the primary draft I vary the speed at which the gases pass through the fuel bed and therefore the time they are in contact with the hot fuel.

Contrary to the practice in producer firing, I do not aim to dissociate the maximum possible proportion of the $CO_2$ of the draft current in the furnace. On the contrary, in normal working the gases are circulated through the fuel at such a velocity that the dissociation is usually less than 50% of the total $CO_2$ that passes through the fuel. I am thus able to easily maintain the temperature of the fuel at a point that insures its maintenance in an active gas-making condition by the sensible heat introduced by the large volume of gases passing through it. My combustion process may therefore be comprehensively described as the maintenance of a continuous circulation of gases from the furnace to the retort oven and back again to the furnace—the return circulation to the furnace consisting of a balanced stream of completely and incompletely burned gases. A volume of completely burned gases corresponding to the air introduced into the combustion flues of the retort oven is continuously rejected from the circulation and sent through the air recuperator. By thus circulating a large volume of gases at high velocity through the combustion flues and the fuel bed of the furnace, as well as by distributing the combustion through the flues, I am able to secure the proper heating of the retorts without the necessity of maintaining an excessively high temperature in the combustion flues, since, as is well known, the velocity of heat transmission through the retorts varies with the velocity of the heating gases along the walls. No increased loss of heat in the rejected gases is occasioned, since the volume rejected from the circulation corresponds to the volume of air used and the two currents in the recuperators are thus about balanced in their thermal capacities.

The above described method of combustion I do not claim herein specifically, but claim it specifically in a separate application.

The minor subdivision of the furnace gases passes up through the furnace shaft in contact with the fresh fuel in chamber 10. It is thus cooled while the fuel is at the same time heated—that in the lower part of 9 being carbonized. In passing through the short column of carbonized fuel more or less of the reactive constituents of the minor subdivision of the primary current suffer dissociation. The gas passing through 10 therefore contains some CO as well as the volatile matters distilled from the coal. These latter are condensed by the cold fuel in the upper part of 9, being absorbed by the coke forming a large proportion of the charge and again carried down into the hot zone of the furnace. They are gradually evolved from the pores of the coke in contact with the hot coke and are more or less broken down into permanently gaseous compounds. A portion of this volatile matter may be again volatilized to be again condensed and carried down. This operation being repeated continuously until all the volatile matter is finally converted into non-condensable gases. The mixed gases are drawn off from 9 through the pipe 29 and forced by blower 28 into the bottom of the furnace. Being comparatively cold, they take up the heat of the fuel and ash in 11, quenching the fuel and cooling the mass. I aim to cool in 9 and introduce into 11 just the volume of gas required to quench and cool the fuel. Since at least about one-half of the charge consists of raw coal, it is obvious that the weight of material withdrawn from 11 will be much less than that charged into 9, for, besides the fuel burned, there is a diminution in weight due to the volatile matter and moisture driven off from the coal. The heat capacity required in the gas used for cooling the material in 11 will therefore always be less than that of the fuel charged in the same period of time. For this reason, sufficient cool gas to quench the material withdrawn from 6 will always be available.

The mixture of unconsumed fuel and ash withdrawn from the furnace at 8 falls into the bin 12 mounted on the truck 58. From 12 the material is gradually discharged onto the conveyer 13 and elevated to the screening apparatus 14. The mixture of fuel and ash is dumped into the hopper 59, and passes from this onto the grizzly or perforated screen 60. 60 is constructed with narrow apertures or slots of a width of not more than say ¼ inch. Air under a slight pressure enters the blast box 61 beneath the grizzly from the pipe 62. The air passing at high velocity through the grizzly, and the material passing over it, takes up the fine ash and carries it over into the ash pipe 63. The coarser particles of the ash, too heavy to be taken up by the air but fine enough to pass through 60, fall into the blast box 61 and are discharged from 61 at intervals by opening the gate 64. The two ash streams are conveyed away through 63 to a dump or directly to cars. The screened coke discharges from 60 through the chute 65 into the bin 15. The bin 16 receives the raw coal which forms part of the charge for the furnace and which is delivered into 16 by the elevator 66. From the bins 15 and 16 the proper proportions of coked and raw coal are discharged onto the conveyer 18 and transported to the furnaces. The conveyer 18 as shown is usually like an ordinary belt conveyer. The side wall of the conveyer (67) is provided with discharge openings 69 which are ordinarily closed by gates. These discharge openings are provided externally with short chutes, 70, so located as to discharge directly into the fuel hoppers 7 of the producers. When it is desired to fill the fuel hopper of any particular producer the gate 69' above that hopper is opened, the dam 71 inserted in the conveyer chute above the belt and the conveyer started. When the fuel arrives at 69 the dam 71 diverts it into the chute 70 from which it falls into the fuel hopper 7 of that particular producer. When this is charged the gate 69' is closed and the same operation repeated with the next producer to be charged.

When charging the retorts the conveyer 18 receives the gas coal for the retorts from the bin 17 and discharges it onto the lateral conveyers 72 through the gates 73 in the wall 68 of the conveyer chute. The dam 71 is inserted into the slots 74 so as to divert the coal through 73 and onto one of the conveyers 72. By setting the dams 71 at successively greater depths, several or all of the lateral conveyers may be used at the same time, as in this case the successive dams up to the last simply scrape each a shallow layer of coal from the conveyer 18.

From 72 the coal is discharged into the open mouth-pieces of the retorts through arrangements similar to those used in the case of 18.

In starting operations, I prefer to charge the retorts A up to the chambers 2 with screened coke, the upper portions 2, only, being charged with coal. When the charge in the chambers 1 has been thoroughly heated up to the proper carbonizing temperature the system is in proper condition for establishing the normal circulation of the gas currents. Part of the cold coke or carbonized fuel in 3 is drawn, a corresponding volume of coal or other fuel descending from 2 into 1 and of hot carbonized fuel from 1 into 3 and the preheating chamber 2 is again charged with fresh fuel.

The height of the preheating chamber 2 will depend directly upon the rate of descent of the fuel mass on the one hand and the velocity of the heat-carrying gases on the other. It is advantageous to have the preheating chamber of a height of from 5 to 10 feet, although this dimension may be varied more or less according to circumstances. The same statement holds true in the case of the cooling chambers 3, although the capacity of the coolers should generally be greater than that of preheating chambers 2.

The gas evolved from the fuel during the carbonizing operation in the retorts is drawn off from the retorts through the Venturi throats 82 and connections 53 from the mouthpieces 54 to the dry mains 23 and passes thence through the conduit 22 (which may be a hydraulic main as shown) and the conduit 115 to the evaporator 116. This is simply a tubular vessel with apparatus for continuously distributing a thin film of water to each of the tubes 117. In the drawings this is accomplished by a short sheet metal nipple 118, slightly belled and notched at its lower extremity so as to be held in the tube by the spring of the bell-shaped portion and at the same time permit the discharge of the water through the notched periphery of the belled portion in a multitude of small streams which quickly converge to form a film on the inner surface of the tubes. The nipples 118, as shown, project above the upper tube sheet 119 of the evaporator 116. Water is supplied above the upper tube sheet at such a rate that there is maintained a small head of water upon the annular discharge openings 120 between the walls of the tubes and the nipples. The water should be supplied only at that rate at which it will discharge through the passages 120 so that it will not flow over the tops of the nipples. The gas from the conduit 115 enters the lower part of the intertubular space 121 of the evaporator and ascends through the same in contact with the tubes. The heat of the gas is thus transmitted through the walls of the tubes to evaporate the water flowing down the inner walls of the tubes. The temperature of the gas in flowing through 116 is reduced to such an extent that the water vapor and easily condensable hydrocarbon vapors such as benzol which it carries will be condensed and drawn off through the sealed discharge pipe 122. The hydrocarbons may then be separated from the water of the condensed liquid in the customary way by fractional distillation. The cooled gas discharges from 116 through the conduit 123 and flows to the exhauster 75. After passing 75 the gas divides into two streams—one stream passing to ordinary scrubbers and purifiers, while the other stream flows to the deluminator 21 through the connection 124. In this it is scrubbed with a liquid commonly known as "wash-oil" in the art which will absorb illuminants such as benzol, ethane, ethylene, etc. From 21 this stream of the gas passes through the ammonia scrubber 104, in which the ammonia is scrubbed out, and then flows back through the conduit 76 to the space 125 of evaporator 116 above the upper tube sheet 119. From 125 the gas flows through the tubes 117 in contact with the water flowing down the same, and is somewhat heated by the water. This gas serves to diminish the tension of the water vapor and so permits the water to evaporate below its normal boiling temperature. The surplus water is returned to the space 125 by the circulating pump 126 through the connections shown. While I do not restrict myself to this method of operation, I deem it advantageous to discharge the gas from 116 practically saturated with water vapor. Instead, however, I may either restrict the evaporation by limiting the quantity of water to that which I desire to evaporate or else by so increasing the quantity of water that its capacity for sensible heat below the evaporating temperature will be increased to the point which will leave available for evaporation only the quantity of heat corresponding to the latent heat of the quantity of water vapor which it is desired to form.

If preferred, I may by-pass the deluminated gas around the evaporator 116 through the by-pass 127 so that the cooling of the coke may be performed entirely by the deluminated gas.

The current of deluminated gas, either with or without the admixture of water vapor, flows back through the pipe 76' to the main 77, from which the gaseous mixture is distributed to the dry mains 78, 78, etc., which run along each row of retorts and are respectively connected to the lower portion of the cooler of each retort of the row with which they coöperate by the connecting passages 79. These passages 79 are each, provided with a regulating valve and a Venturi meter, 81—the latter for giving an approximate measurement of the volume of gas passing to the retorts. By this arrangement, it is possible to secure a very uniform distribution of the returned gas mixture among the several retorts irrespective of normal inequalities in the permeability of their respective charges to the blast. Similarly, by means of the Venturi meters 82 and valves 83 on the off-take connections 53 at the top of the retorts I am able to secure an approximately uniform draw of gas from the retorts irrespective of normal differences in the resistance to the blast offered by the charges in the several retorts. I therefore aim to control the draw from the retorts by carrying the hydraulic main 22 under a sufficiently high vacuum to overcome the resistance to the draft offered by the most closely packed retort and regulate the draw on the other retorts by the flow of gas deduced from the indications of the gage 82'.

The cold deluminated gas or deluminated gas and water vapor entering the bottoms of the retorts ascends through the material occupying the coolers, quenching and cooling this material and is itself heated. In normal working, the material occupying the coolers will, of course, be the coke residue from the coal carbonized in the upper zones of the retorts. The volume of cold deluminated gas returned to the retorts should be such that the descending stream of coke and the ascending stream of gas will be approximately balanced in their respective thermal capacities. With this condition established, the coke will discharge from the retorts at nearly the temperature of the cold gas, while the gas will, in turn, enter the carbonizing region of the retorts at approximately the temperature of the hot coke discharging from the same, or in other words, at about the temperature of carbonization. The returned gas in the carbonizing zone mingles with the gases and vapors evolved from the coal and the mixture and passes upward into the pre-heaters at approximately the temperature of the partially coked coal in the upper part of the carbonizing zone. Since the maximum temperature to which the coal is exposed in the carbonizing zone is somewhat above 2000° F., the temperature in the upper part of the zone will usually be close to 1500° F. The upwardly flowing gas at approximately this latter temperature will therefore extend the carbonizing action into the preheating chambers at the expense of its sensible heat, since carbonization proceeds with considerable freedom even at a temperature as low as 750° F. The bulk of the easily condensable volatile matter will therefore be driven off of the coal in the lower part of the preheating region since I have as the heat carrier to the fuel in the preheater, not only the normal make of gas, but the volume returned to the retorts also. This action of the returned gas in reinforcing the action of the distillation gases as carriers of heat to the fresh fuel is an important function of the gas introduced into the coolers of the retorts.

The condensable vapors evolved in the carbonization will be taken up by the ascending stream of gas and therefore pass in contact with the cold fuel occupying the upper portion of the preheaters. The tarry matter evolved in the distillation will therefore be deposited upon the coal occupying the upper part of the preheaters. The heat capacity of the combined gaseous stream is usually greater than that of the coal charged, since, in order to cool the coke, the gas stream introduced at the bottom should itself have a heat carrying capacity of at least 70 per cent. of that of the coal. This is because in poor gas coals the coke secured will usually run as high as 70 per cent. of the original coal distilled. Since there is not much difference between the specific heats of the coke and coal, and, moreover, the temperature from which it is necessary to cool the coke is higher than the temperature to which the coal is usually heated in the preheating chamber, it is obvious that in this case at least 70 per cent. of the practical heat absorbing power of the fresh coal will be required to cool the hot gases from the cooling chambers. When we add to this the heat of the distillation gases the combined gaseous streams will nearly always have a heat-carrying capacity in excess of that of the fresh coal. The result of this is that the gases withdrawn at the top of the preheating chambers 2 will usually be at a temperature above 212° F. They will therefore carry out of the retorts practically the whole of the water vapor and the benzol and allied compounds. On the other hand, the temperature of the gases drawn off will usually not be much over 300° F. and therefore nearly all of the ordinary tar-forming constituents of the gas will be condensed on the coal in the preheaters. The preheaters therefore fulfil to a large extent the function of condensers and the gas may usually be passed directly to the purifying system without further cooling.

It is manifest that there will be a gradual accumulation of tar in the fuel in the preheater, since all of the condensed liquid that finds its way down through the charge from the point of condensation will encounter a region having a temperature sufficiently high to revaporize it, when it will be again returned to the region of condensation. Unless special precautions are taken to handle the deposited tar therefore, it will interfere seriously with the operation of the retorts by clogging the draft.

To dispose of the tar, I adopt the following method of operation: When the deposit has accumulated to an objectional extent in any row of retorts, the valve 24 connecting the dry main 23 of this row with its hydraulic main 22 is closed, the valves 86 and 87 or 86 and 88 opened and the valve 89 on the deluminated gas main 78 serving that particular set of retorts closed. Deluminated gas or deluminated gas and water vapor, as the case may be, under the pressure of the discharge side of exhauster 75 now flows from 76' through the pipe 90 and deluminated gas main 91 to the dry main 23 of this particular row of retorts and thence through the connections 53 and 82 into the mouth-pieces 54 of the retorts, blowing the fuel column in the upper part of the preheaters free of tar, which is carried down into contact with the moderately hot partially coked coal in the lower part of 2, whereby it is again converted giving vapors and gases. If the valve 87 on the dry main 26 has been opened the gas, mixed with some of the vapors from the tar passes out from the retort through the connections 93 from the upper part of the carbonizing chambers 1 to the dry main 26, thence to the hydraulic main 25, from which it is drawn by the exhauster 94, and from this to some form of condensing apparatus 127. If instead of opening 87 the valve 88 has been opened the gas bearing the revaporized tar is carried down through the highly heated coke, which in normal running fills the carbonizing chamber 1, whereby the tarry vapors are "cracked" down into permanently gaseous hydrocarbons, carbon and hydrogen. The resulting gaseous mixture passes, in this case, through the connections 95 to the appropriate dry main 27 and thence to the hydraulic main 25, following from this the same course as the other stream of gas, just described. Another important function of the reversal of the gas current is the prevention of an undue ascension of the hotter region in the preheaters 2 of the retorts. The returned gas being comparatively cold during its reversed flow cools down the coke in the preheaters 2 and thus tends to drive down the isotherms of the retorts. By regulating the volume of gas returned during the reversals, therefore, I am able to control and regulate the temperature gradient in the preheating chambers 2 to any desired extent.

With average coal and normal working conditions a reversal of the direction of gas flow for about one-fifth of the carbonizing period will usually suffice to keep the fuel clear for the free passage of gas. I prefer to reverse for about one minute out of every five or six. It is, of course, obvious that both the duration of and interval between reversals will vary with the quality of the coal used, the temperature carried in the retorts, the weight of coal carbonized in unit time, and other minor conditions.

It is obvious that by drawing off the gas from the retorts during reversals at selected levels I can secure a fractionating of the tar. This process, however, I do not claim herein but will claim in a separate application.

The coke discharged from the chambers 3, 3, etc., being at practically atmospheric temperature, offers no obstacles to conveyance. I prefer to use the system of operation with frequent draws of coke of small quantities each. I may collect the coke drawn from each row of retorts in a car, 96, similar to 12, provided with a discharge chute, and moving the car into the position shown permit the coke to gradually discharge onto the conveyer 13, when that is not being used to convey the furnace coke and ash, and so carry it to pockets or heaps.

In the operation of my apparatus, while this is not obligatory, I prefer to use the system of frequent small charges and draws, thus approaching to continuous operation. When preferred, however, the charging and drawing may be performed at longer intervals and on correspondingly larger quantities of material. No larger quantity of coke should ever be drawn, however, than that corresponding to the capacity of the carbonizing chamber.

Instead of working intermittently as described, the operation of the retorts may be made absolutely continuous. Indeed, the fact that I remove the coke from the coolers in a cold state and that the fresh fuel is charged into a comparatively cold chamber makes my invention better adapted to continuous working than any other system of carbonization of which I have knowledge. To adapt my apparatus for continuous working it is only necessary to use mouth-pieces provided with a suitable apparatus, not shown in order to obviate complexity of illustration, which will continuously withdraw the coke at the bottom and continuously charge raw fuel at the top.

An important feature of my invention is that instead of redistilling the tar formed in the original distillation of the coal in separate vessels I can, in effect, redistil it in the retort itself. The constituents of the tar which go to form pitch may be broken up in contact with the hot coke, depositing the carbon thereby liberated in the pores of the coke, after an operation similar to the one occurring in bee-hive ovens, whereby the hardness and density of the coke is greatly increased. The principal factor of my invention in the production of a dense coke, however, is the height of the charge column. Owing to the relatively high column of fuel resting on the coal undergoing carbonization, as compared with the height of the column in ordinary vertical retorts, the coal in the carbonizing zone is subjected to comparatively high pressure. This prevents the assumption by the coke of the light scoriaceous structure common in ordinary gas-house coke. By the combination of the two factors mentioned I am able to produce a coke comparable in hardness and density to that produced in bee-hive ovens and admirably adapted to metallurgical use.

An additional improvement in my method of carbonization that improves the quality of the coke in reference to size is the method of heating the retorts from two opposite sides only. To adapt the apparatus for carrying out this feature of my process it is best to construct the retorts with one horizontal dimension much longer than the other, the retorts being set in the oven with the wider faces of the walls parallel to the combustion flues. By this arrangement the coking proceeds simultaneously from the two sides toward the middle, since the heating of the end walls of the retorts is slower owing to the fact that what heat they receive must be by conduction through the thick brick fillings between the retorts. The lines of fracture produced by the shrinkage of the coke during its "setting", if that term may properly be used, therefore run across the fuel column from one heating face to the other. When the retorts are heated approximately equally on all four sides, on the contrary, there are lines of fracture running between each two faces. These two sets of fractures necessarily intersect and thus divide the coke into fragments which usually show more or less uniformity in their cross dimensions. In this embodiment of my method, on the contrary, the coke tends to form into large roughly prismatic pieces having a long dimension equal to half of the distance between the heating faces of the retorts. This quality of the coke is very advantageous from a commercial standpoint.

It should be noted that by taking up the heat of the coke in the gas introduced at the bottom of the cooler and then passing the heated gas in contact with the cold fuel to heat the same I am in effect directly transferring the heat of the coke to the raw fuel since the mixture of the heated gas with the distillation gas does not materially affect the heat carried by the former. It is true that the heated gas from the cooler does not reach the preheating chamber at quite the temperature at which it leaves the cooler since the temperature in the upper part of the carbonizing zone is somewhat lower than the temperature in the lower part thereof owing to the greater amount of distillation that is taking place there. The heat abstracted from this stream of gas, however, is applied to the heating of the fuel. It therefore does not matter from the process point of view whether the heat transfer in question actually takes place in the preheating chamber or the carbonizing chamber. The practical result of the operation is that the coke is not only quenched but that its heat, in excess of the initial temperature of the cooling gas, is wholly transferred, either directly or indirectly, through the fuel to be carbonized to the carbonizing region of the retorts.

Another important feature of my invention is the maintenance of the fuel column in a condition that will permit of the free and ready penetration of the gas current as a result of the periodical reversal of flow described. The free passage of the gas is liable to be obstructed in two ways. First, the deposited tar in the column of raw fuel tends to fill up the interstices of the charge, reducing the area free for the passage of the gases; second, that part of the charge column which is in the immediate stage of carbonization tends to become pasty, the fragments exhibiting a tendency to agglomerate to form a diaphragm across the charge column not easily penetrated by the blast. This diaphragm in a vertical retort takes the shape of an inverted cone, thus tending to force the gases evolved below it to the hot walls of the retort. This results in the cracking down of a serious proportion of the heavy hydrocarbons of this gas current, with a resulting diminution of the illuminating power of the gas and a deposition of a shell of carbon around the inner walls of the retort. Now, during the normal flow of gas the pressure inducing flow is simply that corresponding to the vacuum in the hydraulic main 22. In ordinary working this is maintained as low as possible in order to reduce to a minimum the infiltration of air. During reversal, on the other hand, the reversed gas is flowing under the induction of the vacuum in the hydraulic main and the positive pressure of the exhauster 75. Besides, the reversed current is flowing into the interior of the conical diaphragm which acts to throw the draft to the axis of the retort. The result of these two influences is that the reversed current tends to force its way through the interior of the charge column, perforating the pasty diaphragm in a sufficient number of places to permit of its ready passage. Besides, the reversed current now having the direction of the natural gravity flow of the tarry liquid readily blows this out of the interstices of the fuel column in the preheating chamber and bears it down into the hotter regions of the retort where it is vaporized again. When the normal flow of gas has been restored, therefore, the fuel column is in a condition to permit of the free upward flow of the gas through its interior, until the above-described obstructions have again formed, when the current is again reversed.

It is to be understood that my invention is applicable to the carbonization of any carbonaceous material containing bituminous matter, and is not limited to use with gas or coking coals.

The method of conducting the combustion of the fuel in the furnaces and of heating the retorts I do not claim herein but claim specifically in another application.

What I claim is:

1. In the manufacture of gas and coke the process which comprises, advancing a body of fuel containing hydrogenous matter through a relatively long conduit externally heated at a mid-zone and having relatively long unheated extensions on each side of said zone, gases being removed from a point near the end of the extension toward the charging end of the conduit, whereby volatile hydrocarbons of said gases are condensed on the latest charged fuel in the charging end of said conduit.

2. In the manufacture of gas and coke the process which comprises, advancing a column of fuel containing hydrogenous matter through a relatively long conduit having an intermediate externally heated localized coking zone of coking temperature, an unheated charging end and a gas withdrawing port near the charging end, removing gases from said gas-withdrawing ports, whereby gases from said coking zone are contacted with relatively cool uncoked fuel, and reinforcing the volume of gases passing from said coking zone to said port by the introduction of gases from without the conduit.

3. In the manufacture of coke and gas, the process which comprises producing a relatively long advancing column or prism of coal and coke having a relatively hot externally-heated midportion or zone and relatively cool ends, withdrawing distillation gases at the charging end, whereby said gases are contacted with the relatively cool charging end of said advancing column to condense volatile hydrocarbons from said gases, diverting a portion of such distillation gases, cooling and deluminating said portion and returning into contact with the coke at the withdrawal end to cool said coke.

4. In the manufacture of coke and gas, the process which comprises producing a relatively long advancing column or prism of coal and coke having a relatively hot externally-heated midportion or zone and relatively cool ends, withdrawing distillation gases at the charging end, diverting a portion of such distillation gases, deluminating such portion by contacting the same with an absorbent for illuminating constituents and cooling, and returning into contact with the coke at the withdrawal end to cool said coke.

5. In the manufacture of gas and coke, the process which comprises coking coal in a moving column in a relatively long conduit having an externally heated zone or section of localized heat sufficient for coking, passing a current of gases through the material toward the charging end of the conduit and withdrawing gas at such charging end in contact with the unheated coal in the charging end of said column, the length of conduit, speed of movement of said column and passage of gases being so correlated that the temperature of the withdrawn gas is maintained at a desired point where the undesired higher-boiling body or bodies will tend to remain behind in the fuel.

6. In the manufacture of gas and coke, the process which comprises coking coal in a moving column in a relatively long conduit having an externally heated zone or section of localized heat sufficient for coking, passing a current of gases through the material toward the charging end of the conduit and withdrawing gas at such charging end in contact with the unheated coal in the charging end of said column, the length of conduit, speed of movement of said column and passage of gases being so correlated that the temperature of the withdrawn gas is maintained at above 212° F. and below 300° F.

7. In the manufacture of gas and coke, the process which comprises coking coal in a moving column in a relatively long conduit having an externally heated zone or section of localized heat sufficient for coking, passing a gas current comprising gases introduced from a point without said conduit through the material toward the charging end of the conduit and withdrawing gas at such charging end in contact with the relatively cool coal in the charging end of said column, the length of conduit, speed of movement of said column and passage of gases being so correlated that the temperature of the withdrawn gas is maintained at a desired point where an undesired higher-boiling body or bodies will tend to remain behind in the fuel.

8. In the manufacture of gas and coke, the process which comprises coking coal in a moving column in a relatively long conduit having an externally heated zone or section of localized heat sufficient for coking, passing a gas current comprising gases introduced from a point without said conduit through the material toward the charging end of the conduit and withdrawing gas at such charging end in contact with the relatively cool coal in the charging end of said column, the length of conduit, speed of movement of said column and passage of gases being so correlated that the temperature of the withdrawn gas is maintained at above 212° F. and below 300° F.

9. In the manufacture of gas and coke, the process which comprises coking coal in a moving column in a relatively long conduit having an externally heated zone or section of localized heat sufficient for coking, passing a gas current comprising gases introduced from a point without said conduit through the material toward the charging end of the conduit and withdrawing gas at such charging end, the length of conduit, speed of movement of said column and passage of gases being so correlated that a relatively slowly falling temperature gradient terminating above the dew point of the withdrawn gas but below the boiling temperature of pitch at the charging end is maintained in the said gas current.

10. In the manufacture of gas and coke, the process which comprises coking coal in a moving column in a relatively long conduit having an externally heated zone or section of localized heat sufficient for coking, passing a gas current comprising gases introduced from a point without said conduit through the material toward the charging end of the conduit and withdrawing gas at such charging end, the length of conduit, speed of movement of coal and passage of gases being so correlated that a temperature gradient falling toward the charging end is maintained in the said gas current, the point of withdrawal of gas being changed from time to time along said gradient to obtain different qualities of gas and to remove and recover accumulated high boiling bodies.

11. In the manufacture of gas and coke, the process which comprises coking coal in a moving column in a relatively long conduit having an externally heated zone or section of localized heat sufficient for coking, passing a gas current comprising gases introduced from a point without said conduit through the material toward the charging end of the conduit and withdrawing gas at such charging end, the length of conduit, speed of movement of coal and passage of gases being so correlated that a falling temperature gradient terminating at a temperature above the dew point of the effluent gas but below the boiling temperature of pitch above 212° F. at the charging end is maintained in the said gas current, and alternately withdrawing gas from a relatively cool point in said gradient till the hotter coal therebeyond becomes charged with high-boiling bodies and then withdrawing gas from a relatively hotter point till such high-boiling bodies are removed to a desired extent.

12. In the manufacture of gas and coke, the process which comprises advancing fuel in a comparatively long column or prism through a conduit having a localized mid-zone or section maintained at a high or coking heat by externally heating the same and withdrawing gases at the fuel charging end of said conduit, the length of said conduit between said zone and said charging end, the speed of transit of the advancing fuel and the amount of such gases so withdrawn being so correlated as to produce a gradual increase in the temperature of the fuel as it advances toward said zone and a gradual diminution in the temperature of the gases advancing toward said fuel-charging end to a temperature at which tar will be deposited upon the advancing fuel whereby the withdrawn gases will be discharged comparatively free of tar.

13. In the manufacture of gas and coke, the process which comprises, advancing fuel in a comparatively long column or prism through a conduit having a localized mid-zone or section maintained at a high or coking heat by externally heating the same, the length of said conduit between the charging end and the said zone being that required to insure sufficient contact between the charge and effluent gases to cool the latter to the desired degree, and withdrawing gases at the fuel charging end of said conduit, the length of said conduit between said zone and the amount of such gases so withdrawn being so correlated as to produce a gradual increase in the temperature of the fuel as it advances toward said zone and a gradual diminution in the temperature of the gases advancing toward said fuel charging end to a temperature at which tar of said gases will be deposited upon the advancing fuel, whereby the withdrawn gases will be discharged comparatively free of tar.

14. The step in the process of carbonizing fuel in externally heated retorts which comprises, transferring the major part of the sensible heat of the coked fuel to the fuel undergoing carbonization by contacting first with the said coke and then with the said carbonizing fuel a stream of gas substantially saturated with water vapor before contact with said coke, whereby the said stream of mixed gas and water vapor takes up the major part of the sensible heat of the said coke and then yields up the same to the carbonizing fuel.

15. The step in the process of carbonizing fuel in externally heated retorts which comprises, transferring the major part of the sensible heat of the coked fuel to the fuel undergoing carbonization by contacting first with the said coke and then with the said carbonizing fuel a portion of the gas generated by the carbonization of the said fuel, the said gas having been subjected to cooling and scrubbing by illuminant-absorbents to remove illuminants before being contacted with the said coke, whereby the major part of the sensible heat of the said coke is taken up by the said gas and then given up to the fuel undergoing carbonization.

16. The process of carbonizing fuel in an externally heated conduit which comprises, evaporating water at the expense of the heat carried out of the carbonizing apparatus by the gases produced by the carbonization, mixing the water vapor so-formed with a portion of the cooled and deluminated gases, contacting the said gaseous mixture first with the coke produced in the carbonization and then with the fuel in the process of carbonization, whereby the major part of the heat of the coked fuel is taken up by the said gaseous mixture and yielded up again to the said fuel in process of carbonization.

17. The step in the carbonization of fuel in an externally heated conduit which comprises, transferring the major part of the sensible heat of the coked fuel to the fuel undergoing carbonization by contacting first with the said coke and then with the said carbonizing fuel a stream of gas substantially saturated with water vapor before being contacted with said coke, the volume of the said gaseous stream being so proportioned to the heat of the said coke that the said coke will be cooled down to approximately the initial temperature of the said gaseous mixture, whereby the said stream of mixed gas and water vapor takes up the major part of the sensible heat of the said coke and then yields up the same to the carbonizing fuel.

18. The step in the process of carbonizing fuel in an externally heated conduit which comprises, transferring the major part of the sensible heat of the coked fuel to the fuel undergoing carbonization by contacting first with the said coke and then with the carbonizing fuel a portion of the gas generated by the carbonization of the said fuel, the said gas having been subjected to cooling and scrubbing by illuminant-absorbents to remove illuminants before being contacted with the said coke, and its volume so regulated that the heat carrying capacity of the said gas will be sufficient to take up the sensible heat of the said coke, whereby the major part of the sensible heat of the said coke is taken up by the said gas and then given up to the fuel undergoing carbonization.

19. The process of carbonizing fuel in an externally heated conduit which comprises, evaporating water by the heat of the gases withdrawn from the carbonizing apparatus, mixing with the water vapor so-formed a portion of the said gases, the combined volume of the said portion of the gases and the water vapor being so proportioned to the sensible heat of the coke produced in the carbonization that the heat carrying capacity of the said gaseous mixture will be approximately equal to the sensible heat held by the said coke, contacting the said gaseous mixture first with the said coke and then with the said carbonizing fuel, whereby the major part of the heat of the said coke is taken up by the said gaseous mixture and then yielded up again to the carbonizing fuel.

20. In the continuous carbonization of fuel in an externally heated conduit the process of returning the heat of the products of the carbonization to the carbonizing chamber which comprises, cooling and scrubbing a portion of the gases withdrawn from the said carbonizing chamber to remove illuminants, contacting said cooled portion of the gases with the coke produced by the carbonization, to heat the said portion of gases and to cool the said coke, conducting the heated portion of the gases into the said carbonizing chamber, whereby the said portion of gases is mixed with a fresh portion of the gases generated by the carbonization, and conducting the so-formed gaseous mixture in contact with a volume of unheated fuel to be carbonized, to condense tar-forming constituents of said gases on said unheated fuel.

21. In the continuous carbonization of fuel in an externally heated conduit the process of returning the major portion of the sensible heat of the products of the carbonization to the carbonizing chamber which comprises, dividing the gases withdrawn from said carbonizing chamber into two portions, cooling and scrubbing one portion of said gases to remove illuminants, the volume of the said portion of the gases being such that it will have a heat carrying capacity greater than the heat carried by the coke produced in the carbonization, contacting the said cooled portion of the said gases with the said coke, to cool the said coke and to reheat the said portion of gases, conducting the re-heated portion of said gases into said carbonizing chamber, mixing the said portion of gases with a fresh volume of the gases generated in the said carbonizing chamber, and contacting the so-formed gaseous mixture with the uncarbonized fuel being fed to the said carbonizing chamber.

22. In the continuous carbonization of fuel in an externally heated carbonizing chamber the process of returning the major part of the sensible heat of the products of the carbonization to the carbonizing chamber which comprises, cooling and scrubbing a portion of the gases withdrawn from the said carbonizing chamber to remove illuminants, adding water vapor to the said cooled portion of gases, the volume of the mixture of the cooled gases and water vapor beng so proportioned to the volume of the coke produced in the carbonization that the heat carrying capacity of the said gaseous mixture and the said coke will be approximately equal, contacting the said gaseous mixture with the said coke, to cool the said coke and to reheat the said gaseous mixture, conducting the reheated gaseous mixture into the said carbonizing chamber, adding to the said mixture the gases being produced in the said chamber, and contacting the combined volume of the gases with the uncarbonized fuel being fed to the said carbonizing chamber.

23. In the continuous carbonization of fuel in an externally heated carbonizing chamber the process of returning to the carbonizing chamber the major portion of the sensible heat of the products of the carbonization which comprises, contacting with the coke formed in the carbonization a volume of water vapor, the said volume of water vapor being proportioned to the sensible heat of the said coke, to heat the said water vapor and to cool the said coke, conducting the heated water vapor into contact with the fuel undergoing carbonization, mingling unchanged water vapor with the distillation gases produced in the carbonization, and contacting the resulting gaseous mixture with the uncarbonized fuel being fed to the carbonizing chamber.

24. In the continuous carbonization of fuel in an externally heated carbonizing chamber the process which comprises, contacting the hot gases from the carbonizing chamber with a body of fuel before the said fuel has entered the said carbonizing chamber, to transfer a portion of the heat of the said gases to the said fuel, further cooling said gases by passing the same through a recuperator, withdrawing from the cooled gases a portion of the same such that its heat carrying capacity will be approximately equal to the sensible heat of the coke produced in the carbonization, scrubbing the portion of said gases withdrawn to remove illuminants, repassing the said portion of gases through said recuperator, to heat said gaseous stream by heat abstracted from the gases withdrawn from contact with the said fuel, and contacting said gaseous stream after the same has repassed said recuperator first with the initially hot coked fuel and then with the carbonizing fuel.

25. In the continuous carbonization of fuel in an externally heated carbonizing chamber the process which comprises, contacting the hot gases from the carbonizing chamber with a body of fuel before the same has entered the said carbonizing chamber, to transfer a portion of the heat of the said gases to the said fuel, further cooling the said gases by passing the same through a recuperator, dividing the said gases into two streams, repassing one of said streams through said recuperator in the presence of water, to evaporate a portion of the said water and to heat the water vapor formed and the gases of said stream by heat abstracted from the gases withdrawn from contact with the said fuel, and contacting the mixture of said gases and water vapor first with the initially hot coked fuel and then with the carbonizing fuel, to return the major part of the sensible heat of the said coke to the said carbonizing chamber.

26. In the continuous carbonization of fuel in an externally heated carbonizing chamber the process which comprises, contacting the hot gases from the carbonizing chamber with a body of fuel before the same has entered the said carbonizing chamber, to transfer a portion of the heat of the said gases to the said fuel, further cooling said gases by passing the same through a recuperator, dividing said cooled gases into two streams, removing the major portion of the illuminating constituents from one of said streams, repassing the partially deluminated gas of the said stream through said recuperator in the presence of water, to evaporate a portion of the said water and to heat the said deluminated gas and the water vapor formed by the heat abstracted from the gases withdrawn from contact with the said fuel, and contacting the said mixture of deluminated gas and water vapor first with the coke produced by the said carbonization and then with the fuel in process of carbonization, to return the heat of the said coke to the said carbonizing chamber.

27. In the continuous carbonization of fuel in an externally heated carbonizing chamber the process which comprises, contacting the hot gases from the carbonizing chamber with a body of fuel before the same has entered said carbonizing chamber, to transfer a portion of the heat of the said gases to the said fuel, further cooling said gases by passing the same through a recuperator, dividing said gases into two streams, removing the major portion of the illuminants from one of said streams, repassing the deluminated gaseous stream through said recuperator in the presence of water, to form a mixture of deluminated gas and water vapor at the expense of the heat of the gases withdrawn from contact with the said fuel, the volume of the said mixture being so proportioned to the heat of the said coke that the heat carrying capacity of the said mixture will be greater than the available sensible heat of the said coke, and contacting the said mixture of deluminated gas and water vapor first with the said coke and then with the fuel undergoing carbonization, to return the heat of the said coke to the said carbonizing chamber.

28. In the continuous carbonization of fuel in an externally heated carbonizing chamber the process which comprises, contacting the gases withdrawn from the carbonizing chamber with a body of fuel before the said fuel has entered said carbonizing chamber, to transfer a portion of the heat of the said gases to the said fuel, further cooling said gases by passing the same through a recuperator, dividing the cooled gases into two streams, removing the major portion of the illuminants and the ammonia from one of said streams, repassing the said partially deluminated and ammonia free gas through said recuperator in the presence of water vapor, to heat the said deluminated gas and to substantially saturate the same with water vapor by heat abstracted from the gases withdrawn from contact with the said fuel, and contacting the mixture of deluminated gas and water vapor first with the coke from the said carbonizing chamber and then with the carbonizing fuel in said carbonizing chamber, to return the major portion of the heat of the said coke to the said carbonizing chamber.

29. In the continuous carbonization of fuel in an externally heated carbonizing chamber the process which comprises, contacting the gases from the carbonizing chamber with a body of fuel before the said fuel has entered said carbonizing chamber, to transfer a portion of the heat of the said gases to the said fuel, further cooling said gases by passing the same through a recuperator, dividing said gases into two streams, removing the major portion of the illuminants from one of said streams, repassing the partially deluminated gaseous stream through said recuperator in the presence of water, to evaporate a portion of the said water and to heat the water vapor formed and said deluminated gas by heat abstracted from the gases withdrawn from contact with the said fuel, the volume of the mixture of water vapor and deluminated gas being such as will have a heat carrying capacity greater than the sensible heat of the coke discharged from the said carbonizing chamber, contacting the said mixture of water vapor and deluminated gas first with the said coke and then with the carbonizing fuel in the said carbonizing chamber, to return the major portion of the sensible heat of the said coke to the said chamber.

30. In the continuous carbonization of fuel in an externally heated carbonizing chamber the step which comprises, passing the gases withdrawn from the carbonizing chamber through an evaporator to generate water vapor at the expense of the heat of the said gases, contacting the water vapor formed first with the initially hot coke from the said carbonizing chamber, and contacting products of the reaction of said vapor with said coke and unchanged vapor with the fuel undergoing carbonization in said chamber, to return the major portion of the heat of said coke to the said chamber.

31. In the carbonization of fuel in an externally heated carbonizing chamber the step which comprises, transferring the major portion of the sensible heat of the gases withdrawn from the carbonizing furnace to a body of water to evaporate the same, the said water being in contact with a stream of permanent gas whose volume is sufficient to reduce the temperature of evaporation of the said water, by reducing the tension of the water vapor formed, to a point above which the sensible heat of the said gases will be sufficient to effect the evaporation of the desired quantity of water.

32. In the carbonization of fuel in an externally heated carbonizing furnace the step which comprises, transferring the major portion of the sensible heat of the gases withdrawn from the carbonizing furnace to a body of water to evaporate the same, the said water being in contact with a stream of a permanent gas whose volume is sufficient to reduce the temperature of evaporation of the said water, by reducing the tension of the water vapor formed, to a point above which the sensible heat of the said gases will be sufficient to effect the evaporation of the desired quantity of water, and contacting the mixture of permanent gas and water vapor first with the said coked fuel, whereby the sensible heat of the said coked fuel is taken up by the said gaseous mixture, and then with the fuel undergoing carbonization, to return the major portion of the heat of the said coke to the said carbonizing chamber.

33. In the carbonization of fuel in an externally heated carbonizing furnace the step which comprises, transferring the major portion of the sensible heat of the gases withdrawn from the carbonizing furnace to a body of water to evaporate the same, the said water being in contact with a stream of a permanent gas whose volume is sufficient to reduce the temperature of evaporation of the said water, by reducing the tension of the water vapor formed, to a point above which the sensible heat of the said gases will be sufficient to effect the evaporation of that quantity of water whose vapor, together with the said permanent gas, will have a sufficient heat absorbing capacity to cool the coke from the said carbonizing chamber.

34. In the carbonization of fuel in an externally heated carbonizing furnace the process which comprises, transferring the major portion of the sensible heat of the gases withdrawn from the carbonizing furnace to a body of water to evaporate the same, the said water being in contact with a stream of a permanent gas whose volume is sufficient to reduce the temperature of evaporation of the water, by reducing the tension of the water vapor formed, to a point above which the sensible heat of the said gases will be sufficient to effect evaporation of that quantity of water whose vapor, together with the said permanent gas, will have a sufficient heat absorbing capacity to cool the coke from the said carbonizing chamber, and contacting the mixture of permanent gas and water vapor first with the coked fuel, whereby the sensible heat of the coked fuel is taken up by the said gaseous mixture, and then with the fuel undergoing carbonization, whereby the heat of the said gaseous mixture is in part returned to the carbonizing chamber.

35. In the carbonization of fuel in an externally heated carbonizing chamber the step which comprises, passing the gases from the carbonizing chamber in contact with a body of the fuel which is to be carbonized, to preheat the said fuel and to partially cool the said gases, transferring the major portion of the remaining sensible heat, above atmospheric temperature, of the said gases to a body of water to evaporate the same, the said body of water being in contact with a stream of a permanent gas whose volume is sufficient to reduce the temperature of evaporation of the said water, by reducing the tension of the water vapor formed, to a point above which the sensible heat of the said gases and the latent heat of the condensable vapors carried by the said gases will be sufficient to effect the evaporation of the desired quantity of water, and contacting the resulting mixture of permanent gases and water vapor with the coke from said carbonizing chamber, to cool the said coke.

36. The process of carbonizing fuel and making gas in a closed conduit which comprises, charging said fuel into an unheated extremity of said conduit, preheating the said fuel, in the region of said conduit adjacent to the said extremity thereof, by contacting with the said fuel hot gases from the carbonization of said fuel, to heat the said fuel and to cool the said gases, carbonizing the preheated fuel in the middle region of said conduit by external heating of said middle region, quenching the coke from the carbonization of said fuel and cooling the quenched coke by contacting therewith a portion of the gases which have been cooled in the preheating of said fuel, the volume of the said portion of such gases being that required to absorb the heat of said coke, and discharging the cooled coke from the other extremity of said conduit.

37. The process of carbonizing fuel and making gas in a closed conduit which comprises, charging said fuel into an unheated extremity of said conduit, preheating the said fuel in the region of said conduit adjacent to the said extremity thereof, by contacting with the said fuel a stream of initially hot gases, to heat the said fuel and to cool the said gases, carbonizing the preheated fuel in the middle region of said conduit by external heating of said middle region, withdrawing from said chamber gases cooled in the preheating of said fuel, removing illuminants from a portion of said gases, quenching the residue from the carbonization of said fuel and cooling the said residue by contacting therewith in the region of said conduit adjacent to the other extremity thereof cooled and deluminated gas, and discharging the cooled carbonized fuel residue from the said other extremity of said chamber.

38. The process of carbonizing fuel and making gas in a closed comparatively long conduit which comprises, charging said fuel into an unheated extremity of said conduit, preheating the said fuel in the region of said conduit adjacent to the said extremity thereof, by contacting with the said fuel hot gases from the carbonization of said fuel, to heat the said fuel and to cool the said gases, carbonizing the preheated fuel in the middle region of said conduit by external heating of said middle region, withdrawing from the fuel preheating region of said conduit the gases which have been contacted with the fuel therein, removing illuminants from a portion of said gases, quenching the fixed residue from the carbonization of said fuel and cooling the said residue by contacting therewith, in the region of said conduit adjacent to the other extremity thereof, a portion of deluminated gas, the volume of said portion of deluminated gas being that required to absorb substantially all of the heat of said carbonized residue above the temperature of said deluminated gas, and discharging the cooled coke from the other extremity of said conduit.

39. The process of carbonizing fuel and making gas in a vertical retort having comparatively long externally unheated end extensions which comprises, preheating said fuel in the upper region of said retort by passing in contact with said fuel the gases from the carbonizing region of said retort, to cool the said gases to a point that will cause deposition of tar of said gases upon said fluid, carbonizing the said preheated fuel in an intermediate localized carbonizing region of said retort, withdrawing carbonized fuel formed in said carbonizing region of the retort into the portion of said retort below said carbonizing region, introducing into the externally unheated lower end extension of said retort a stream of cooled and substantially deluminated gas, passing said gas stream upward through said retort in contact with the said carbonized fuel, to cool the said carbonized fuel and to heat the said gas, withdrawing the cooled carbonized fuel from the bottom of said retort and mixing the heated gas with the gases distilled from the said fuel in the carbonization of the same.

40. The process of carbonizing fuel and making gas in a vertical retort having comparatively long externally unheated end extensions which comprises, preheating the said fuel in the upper end extension of said retort by passing in contact with said fuel the gases from an intermediate carbonizing region of said retort, whereby the said gases are at the same time cooled and tar forming constituents of said gases condensed on said fuel, carbonizing the said fuel in the said carbonizing region of said retort by external heating of said carbonizing region, withdrawing the carbonized fuel formed in the carbonizing region of the retort into the externally unheated end extension of the retort below said carbonizing region, withdrawing the gases cooled in the fuel preheating region of said retort, diverting a portion of the same, removing the major part of the illuminants from said diverted portion of gases, introducing the said portion of partially deluminated gas into the lower end extension of said retort, passing the said portion of gas upward through said retort in contact with said carbonized fuel, to cool the said carbonized fuel and to heat the said portion of gas, the volume of the said deluminated portion of the gas being that required to absorb substantially all of the sensible heat of the said carbonized fuel above the temperature at which the said portion of deluminated gas is introduced into said retort, passing the heated deluminated gas in contact with the carbonizing fuel in said retort, whereby the said gas is caused to again take up illuminating constituents, merging the said gas with the distillation gases of said fuel, and withdrawing the cooled carbonized fuel from the lower end extension of said retort.

Signed at New York city in the county of New York and State of New York this 14th day of November A. D. 1911.

HENRY L. DOHERTY.

Witnesses:
FRANK L. BLACKBURN,
H. A. MACKENZIE.